Feb. 1, 1949.  C. J. SMITH  2,460,544
HAY LOADER
Filed May 24, 1946  4 Sheets-Sheet 1
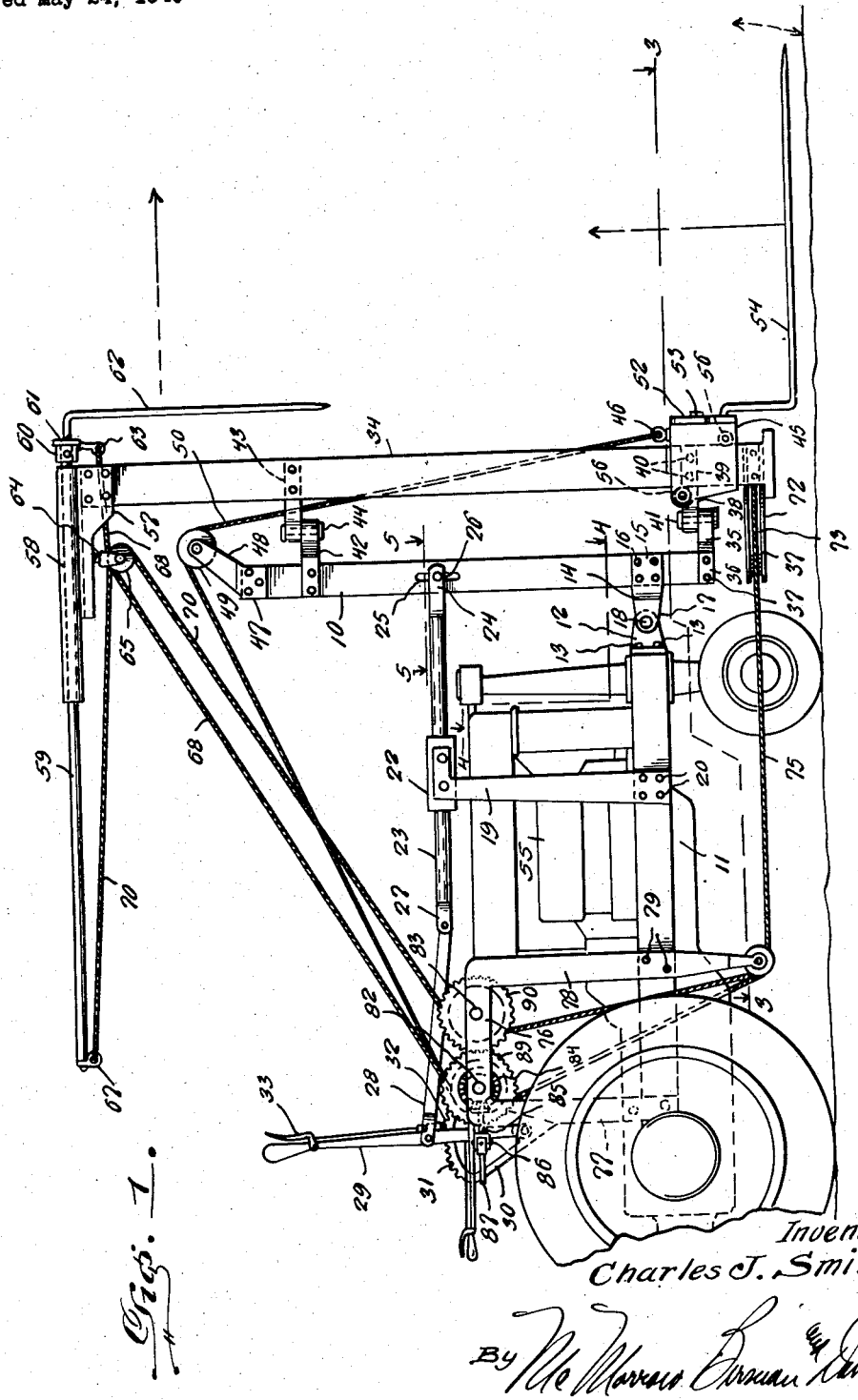
Inventor
Charles J. Smith,
By
Attorneys Feb. 1, 1949.     C. J. SMITH     2,460,544
HAY LOADER
Filed May 24, 1946     4 Sheets-Sheet 2
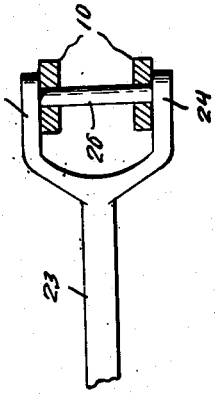
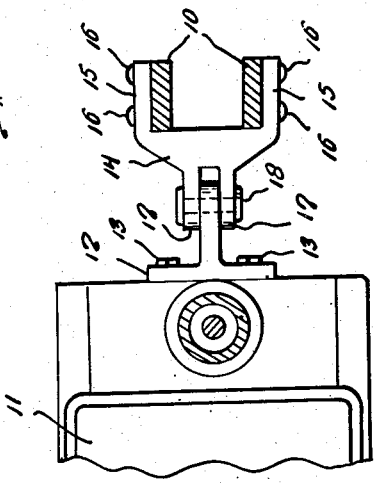
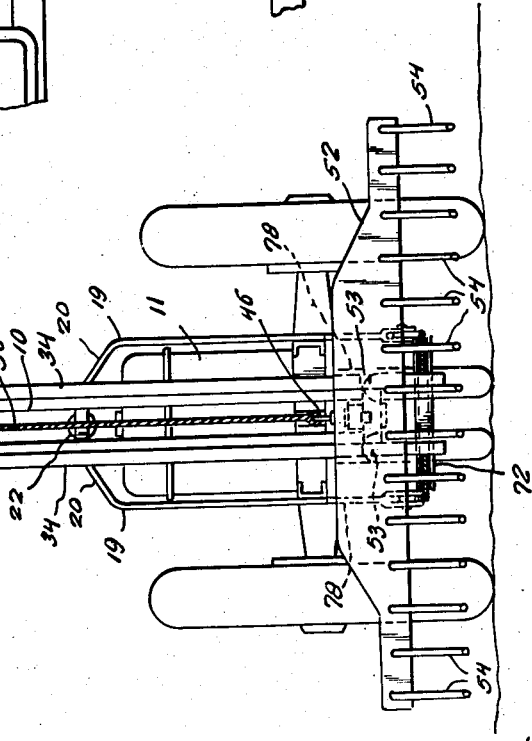
Inventor
Charles J. Smith,
By
Attorneys

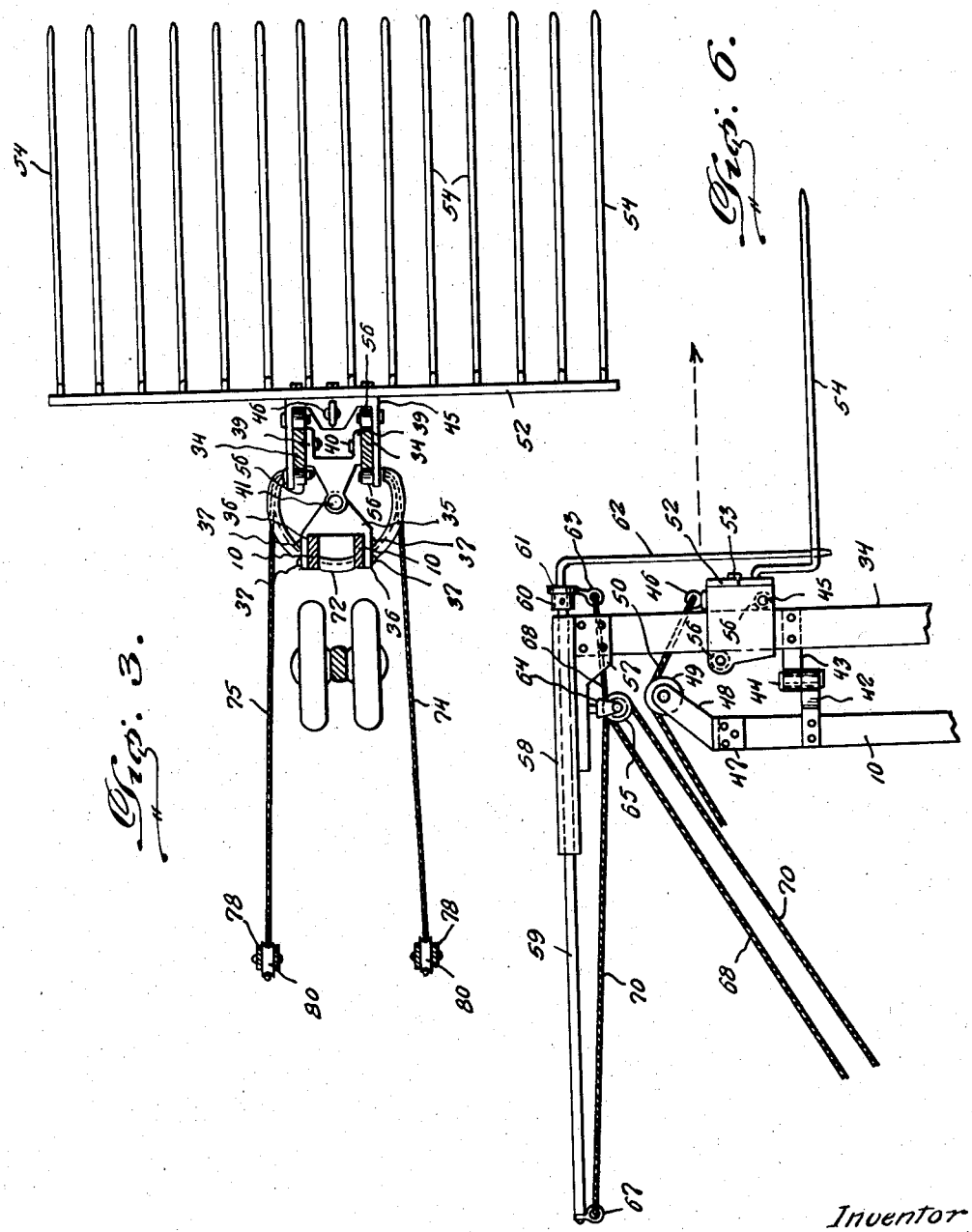

Feb. 1, 1949. C. J. SMITH 2,460,544
HAY LOADER
Filed May 24, 1946 4 Sheets-Sheet 4
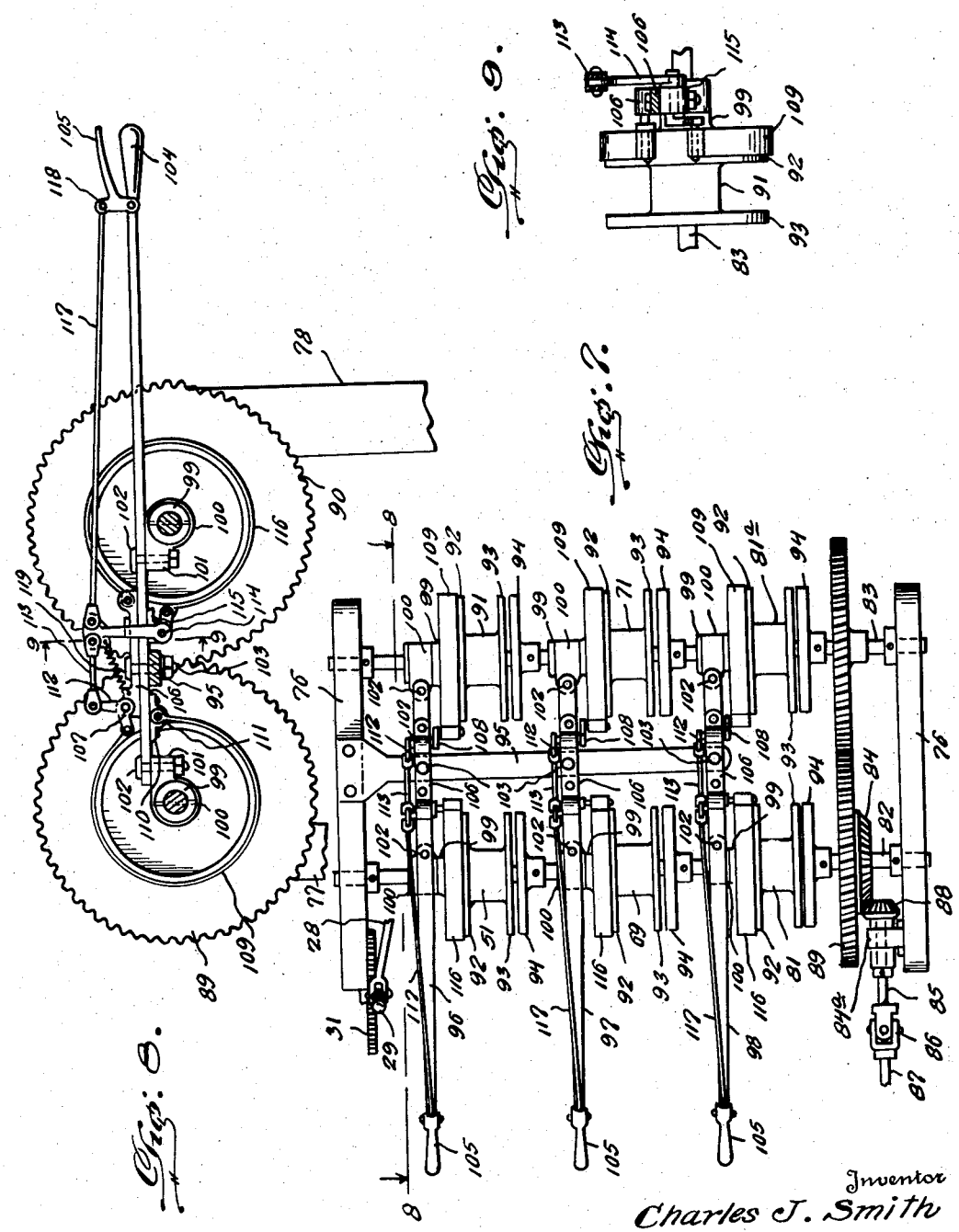
Inventor
Charles J. Smith Patented Feb. 1, 1949

2,460,544

UNITED STATES PATENT OFFICE 2,460,544

HAY LOADER

Charles J. Smith, Albany, N. Y.

Application May 24, 1946, Serial No. 671,957

8 Claims. (Cl. 214—112)

My invention relates to agricultural machinery, and most particularly to hay loaders.

The object of my invention is to produce a hay loader adapted to be attached to an automotive vehicle to gather hay from the ground and deliver it to a hay wagon or the like.

Another object of my invention is to produce a hay loader adapted to lift a load of gathered hay and to deliver it to a hay wagon or the like located at either side of the hay loader.

Other objects of my invention may appear in the following specification, describing my invention, with reference to the accompanying drawings illustrating a preferred embodiment of my invention.

It is, however, to be understood that my invention is not to be limited and restricted to the exact construction and combination of parts described in the specification and shown in the drawings, but that such changes and modifications can be made, which fall within the scope of the claims appended hereto.

In the drawings:

Figure 1 is a side elevation of a hay loader according to my invention shown attached to a tractor.

Figure 2 is a front view of the hay loader shown in Figure 1.

Figure 3 is a sectional view taken on line 3—3 of Figure 1.

Figure 4 is a sectional view in a larger scale taken on line 4—4 of Figure 1.

Figure 5 is a sectional detail view taken on line 5—5 of Figure 1.

Figure 6 is a fragmentary side elevational view of the hay loader according to my invention showing the hay-gathering prongs in elevated position.

Figure 7 is a top plan view of the control mechanism of the hay loader according to my invention.

Figure 8 is a sectional view taken on line 8—8 of Figure 7.

Figure 9 is a sectional view taken on line 9—9 of Figure 8.

Referring now in detail to the drawings, a supporting frame 10 consisting mainly of two flat bars arranged parallel to each other is adjustably attached to the front of a tractor 11 in the following manner: A T-shaped bracket 12 is rigidly mounted on the front of the tractor frame by means of bolts 13. A connecting member 14 has two forwardly extending arms 15 which are arranged closely adjacent and securely fastened to the supporting frame 10 by means of rivets 16 or the like, as clearly shown in Figure 4. The connecting member 14 has also two rearwardly extending prongs 17, which receive the forwardly extending flange of the T-shaped bracket 12 between them and are pivotally fastened thereto by a bolt 18.

On each side of the tractor frame an upwardly extending frame leg 19 is firmly attached by bolts 20 or the like. The upper portions 21 of these frame legs 19 incline inwardly toward each other and support between them a pipe 22. An adjusting rod 23 is arranged slidably in the pipe 22 and is bifurcated at its front end, forming two prongs 24 located close to the outside surfaces of the bars of the supporting frame 10. In each of these bars a slot 25 is provided and a bolt 26 extends through said slots and said prongs 24.

The rear end of the adjusting rod 23 is also bifurcated as indicated at 27 in Figure 1, and a connecting bar 28 is pivotally mounted in said bifurcation. The rear of this connecting bar 28 is bifurcated and an adjusting lever 29 is arranged in this bifurcation. The adjusting lever 29 is pivotally mounted on a bracket 30 securely fastened to the frame of the tractor. The uppermost part of the bracket 30 is formed into a toothed arcuate adjusting member 31 and the adjusting lever 29 is pivotally connected with the connecting bar 28 above said adjusting member. A spring-controlled pawl 32 of well known construction engages the toothed adjusting member 31 and a hand lever 33 attached to the adjusting lever 29 is adapted to disengage the pawl 32 from said adjusting member, permitting the adjusting lever 29 to be moved forwardly or rearwardly, thereby adjusting the angular position of the supporting frame 10 relative to the tractor frame by pivoting the supporting frame about the bolt 18.

A loading frame 34 consisting mainly of two flat bars is pivotally connected with the supporting frame 10 in the following manner: A hinge member 35 has two rearwardly extending arms 36 which are located outside of the bars forming the supporting frame 10 and are rigidly mounted on the lower end of these bars by rivets 37 or the like. A second hinge member 38 has two forwardly extending arms 39 which are located adjacent the inside surfaces of the bars forming the loading frame 34 and are securely fastened thereon by bolts 40 or the like. The hinge member 38 is arranged on top of the hinge member 35. Each of said members is provided with a hole therein and a hinge pin 41 extending through these holes connects the two hinge members.

Another hinge member 42 similar to the first-named hinge member 35 is firmly attached to the bars of the supporting frame 10 at a distance below their upper ends, and a fourth hinge member 43 similar to the second hinge member 38 is securely fastened onto the bars of the loading frame 34 so that said last-named hinge member 43 is arranged on top of the third hinge member 42. A hinge pin 44 connects the two last-named hinge members 42 and 43, so that the loading frame 34 is hingedly supported by the support frame 10.

A U-shaped traveler 45 has its flanges extending rearwardly on the outside of the bars of the loading frame 34. The portion of the U-shaped traveler connecting the two flanges is arranged across the front of the loading frame and a hook or an eye 46 is firmly secured to its upper surface.

A bracket 47 is fastened onto the top ends of the support frame bars and extends across the upper end of said frame 10. Two bearing arms 48 extend upwardly and forwardly from the bracket 47 and support rotatably a sheave 49. A cable 50 is fastened to the eye 46 on the traveler 45 and is trained over the sheave 49 and leads to a winding drum 51 forming a part of the loading control mechanism to be described later.

A front plate 52 is fastened to the front of the traveler 45 by means of bolts 53 and supports a plurality of forwardly extending fork prongs 54, which are arranged and formed so that they are located adjacent the ground to gather hay spread on the ground in front of the hay loader while the tractor 11 is driven forward by its motor 55. Any unevenness of the ground is overcome by manipulating the adjusting lever 29 to regulate the angular relation between the support frame 10 and the frame of the tractor 11.

To facilitate the movement of the traveler 45 on the loading frame 34 rollers 56 are mounted rotatably on the flanges of the traveler and engage the edges of the bars of the loading frame.

A top bracket 57 is securely fastened to the outsides of the bars forming the loading frame 35 and extends across the top of said frame and rearwardly therefrom. A pipe 58 is welded on top of the bracket 57 to extend fore and aft and a rod 59 is arranged slidably in the pipe 58. A socket 60 is securely fastened to the front end of the rod 59 and a cross plate 61 is firmly connected with the socket 60, for instance by welding, and extends horizontally across the front of the hay loader. A plurality of downwardly extending prongs 62 are rigidly mounted on the cross plate 61.

An eye bracket 63 is formed on the socket 60 and extends downwardly and laterally therefrom. A double bracket 64 is firmly mounted on the top bracket 57 and extends downwardly therefrom. Two sheaves 65 and 66, respectively, are rotatably mounted in the double bracket 64, and a second eye bracket 67 is securely fastened to the rear end of the sliding rod 59. A cable 68 is fastened onto the first eye bracket 63 trained over the sheave 66 on the double bracket 64 and leads to a winding drum 69, which is a part of the loading control mechanism to be described later.

A third cable 70 is attached to the second eye bracket 67, trained over the sheave 65, and leads to a third winding drum 71, also forming a part of the control mechanism.

On the lower ends of the bars forming the loading frame 34 a substantially circular bracket 72 is fastened which extends rearwardly from the loading frame 34 and is located underneath the support frame 10. This circular bracket has a groove 73 in its circumferential surface. Two cables 74 and 75, respectively, are fastened to the bracket 72 on the junction points with the loading frame 34. The cables are arranged in the groove 73.

On each side of the frame of the tractor 11 a frame member for the control mechanism is fastened. Each of these members has a horizontal element 76, and two downwardly extending leg elements 77 and 78, respectively. The forward leg elements 78 are fastened onto the tractor frame, as indicated at 79, and extend downwardly beyond the tractor frame and the lower ends of these leg elements 78 are bifurcated. In each of these bifurcations a sheave 80 is rotatably mounted.

The cable 74 is trained over one of these sheaves 80 and the cable 75 over the other sheave 80. Cable 74 leads to a winding drum 81 and the cable 75 to a companion winding drum 81a.

The rearward leg element 77 is also fastened to the tractor frame but does not extend downwardly beyond this frame.

The adjusting lever bracket 30 is attached to the rearward upper corner of the mechanism frame members.

Two shafts 82 and 83, respectively, are rotatably supported by the horizontal elements 76 of the mechanism frame and extend parallel to each other across the tractor and are spaced from each other. A bevel gear 84 is rigidly mounted on the rear shaft 82 adjacent one end thereof. A bracket 84a is fastened to and extends inwardly of the mechanism frame element 76 adjacent the bevel gear 83 and a short shaft 85 extends fore and aft, and is rotatably arranged in the bracket 84a. The short shaft 85 is connected by means of a universal joint 86 to a shaft 87 adapted to be driven by the tractor motor 55 through a power take-off (not shown). On the forward end of the short shaft 85 a second bevel gear 88 meshing with the first bevel gear 84 is rigidly mounted.

Adjacent this bevel gear 84 a spur gear 89 is rigidly mounted on the rear shaft 82 and a second spur gear 90 meshing with the first spur gear 89 is rigidly mounted on the forward shaft 83, so that the two shafts are always driven in opposite directions.

The winding drums 51, 69 and 81 are mounted slidably and rotatably on the rear shaft 82. On the forward shaft 83 the winding drums 81a and 71 are slidably and rotatably mounted so that the drum 81a is located in front of the drum 81 on the rear shaft 82, and drum 71 in front of the drum 69 on the rear shaft. Another winding drum 91 is slidably and rotatably mounted on the front shaft 83 in front of winding drum 51.

Each winding drum has a wide brake flange 92 and a narrow clutch flange 93. Spaced from each clutch flange 93 a clutch disc 94 is rigidly mounted on the respective shaft.

A support arm 95 is firmly attached to the top of the horizontal frame element 76 on the opposite side from the gears 89 and 90 and extends inwardly therefrom. It is located between the two shafts 82 and 83.

Three control levers 96, 97 and 98, respectively, are pivotally mounted on the support arm 95. Each control lever is located adjacent the brake flange 92 of the winding drums. On each brake flange 92 a hub 99 is formed surrounded by a shift member 100 provided with a shift arm 101. These shift arms are pivotally connected with the corresponding control lever by means of pivot pins 102. The pivot connections 103 of the control levers with the support arm 95 are located midway between each pair of pivot pins 102. The control lever 96 is connected in this manner with the winding drums 51 and 91, the control lever 97 with the drums 69 and 71, and the control lever 98 with the drums 81 and 81a.

The control levers extend rearwardly and each lever is provided with a handle 104.

A hand lever 105 is pivotally connected with each control lever adjacent the inner end of the handle 104. A brake block 106 is mounted on each control lever between the adjacent brake flanges. In the front end of each brake block 106 a pivot pin 107 is pivotally arranged. A lever arm 108 is rigidly mounted on this pin extends forwardly thereof and is pivotally connected with a brake band 109 surrounding each of the brake flanges 92 of the winding drums mounted on the front shaft 83.

Underneath each control lever a bearing bracket 110 is arranged in which a pin 111 is located holding the other end of the brake band 109.

On the other end of each pivot pin 107 a second lever arm 112 is rigidly mounted and is pivotally connected with a connecting link 113, the rear end of which is pivotally connected with the upwardly extending arm of a crank lever 114 pivotally supported by a bearing bracket 115, which is arranged underneath each control lever. The rearwardly extending arm of this crank lever 114 is pivotally connected with one end of a brake band 116 surrounding each brake flange 92 of the winding drums mounted on the rear shaft 82. The other end of each brake band 116 is fastened to the rear end of the corresponding brake block 106. A connecting rod 117 is pivotally connected at one end with an arm 118 extending at approximately right angles to the hand levers 105 and at the other end to the upright extending arm of the crank lever 114.

A strong helical spring 119 extends between the forward end of each brake block 106 and the corresponding upwardly extending arm of each crank lever 114 urging said arm forwardly, whereby the brake bands 109 and 116 are put into working contact with the corresponding brake flanges 92.

Normally, all winding drums are engaged by the corresponding brake bands under the influence of the spring 119.

When the forwardly extending prongs 54 have gathered a load of hay, the hand lever 105 on the control lever 96 is actuated whereby the winding drums 51 and 91 are disengaged from their brakes. The control lever is then pivoted to bring the clutch flange 93 of the drum 51 into contact with the adjacent clutch disc 94 which rotates with the shaft 82 as long as the motor 55 runs. The cable 50 is wound up on the drum 51 raising the traveler 45 and the prongs 54 into the position shown in Figure 6. Then the drum 51 is freed from the clutch disc and the hand lever is let loose so that the spring 119 forces the brake bands into braking position, preventing the traveler 45 and its load from downward movement.

Winding drums 81 and 81a are then freed from their brakes and the drums are put into clutch-engaging position whereby one of the cables 74 and 75 is wound up on its drum and the other one unwound, so that the loading frame 34 is pivoted about the pivot pins 41 and 44 swinging the load on the raised prongs 54 at will to the right or the left over a hay wagon or the like (not shown).

Then the winding drums 69 and 71 are set into operation by means of the control lever 97 to move the sliding rod 59 and the downwardly extending prongs connected therewith forwardly to remove the load from the prongs 54.

Having described my invention, I claim as new and desire to secure by Letters Patent:

1. A hay loader adapted to be attached to an automotive vehicle including a support frame, a loading frame, and a plurality of gathering prongs on the loading frame adapted to be moved upwardly and downwardly on the loading frame, said loading frame being hingedly supported by the support frame, and means for swinging the loading frame and the gathering prongs thereon at will to the right or to the left, said means consisting of a pair of winding drums, each drum being slidably and rotatably mounted on a horizontal shaft extending transversely of the vehicle, said shafts being adapted to be driven in opposite directions by the motor of the automotive vehicle, a brake on each drum, a spring permanently urging said brakes into working position, a clutch flange on each drum, a clutch disc rigidly mounted on each shaft and spaced from the clutch flange, a control lever adapted to move the drum in and out of clutch-engaging position, a hand lever pivotally mounted on the control lever for releasing the drums from their brakes, a substantially circular bracket on the loading frame having a circumferential groove therein, and a cable fastened to each side of the loading frame and arranged in said groove, one of said cables leading to one of the winding drums and the second cable leading to the other drum.

2. A hay loader adapted to be attached to an automotive vehicle, including a support frame, an upright loading frame, a plurality of gathering prongs supported by the loading frame, and means for moving said prongs as a unit upwardly and downwardly on the loading frame, the loading frame being hingedly supported by the support frame, means for swinging the loading frame on the support frame at will to the right or left, a plurality of downwardly extending unloading prongs supported on top of the loading frame, and means for moving the unloading prongs lengthwise in relation to the gathering prongs, the last-named means consisting of a pipe bracket fastened to the top of the loading frame, an unloading rod slidably arranged in the pipe bracket, the unloading prongs being fastened to the unloading rod, a pair of winding drums, each drum rotatably and slidably mounted on a shaft, said shafts being adapted to be driven by the motor of the vehicle in opposite directions, a brake and a clutch for each drum, the brakes normally engaging the drums, a control lever for simultaneously engaging each drum with the corresponding clutch, a hand lever on the control lever for simultaneously releasing the drums from the brakes, a cable connecting the front end of the unloading rod with one of the drums, and a second cable connecting the rear end of the unloading rod with the second drum.

3. In a hay loader, a wheeled support, a substantially vertical support frame pivotally mounted upon the wheeled support and adapted to swing vertically, means associated with the wheeled support to cause the support frame to swing vertically, a substantially vertical loading frame pivotally mounted upon the support frame and adapted to swing horizontally, means associated with the wheeled support to cause the loading frame to swing horizontally, a traveler mounted upon the loading frame and adapted to move longitudinally thereof, hay gathering means carried by the traveler and extending forwardly of the same, means to move the traveler, horizontally movable hay unloading means arranged near the top of the loading frame for co-action with the hay gathering means, and means to move the hay unloading means.

4. In a hay loader, a wheeled support, a substantially vertical support frame pivotally mounted upon the wheeled support and adapted to swing vertically, means including a substantially horizontal reciprocating member mounted upon the wheeled support and connected with the support frame for swinging the same vertically, a substantially vertical loading frame pivotally mounted upon the support frame and adapted to swing horizontally and extending above the support frame, power operated means mounted upon the wheeled support and connected with the loading frame for swinging the loading frame horizontally, a traveler mounted upon the loading frame and adapted to move vertically along the same, a substantially horizontal hay gathering member carried by the traveler and projecting forwardly of the same, power operated means mounted upon the wheeled support and connected with the traveler for raising and lowering the same, a horizontally reciprocating member mounted upon the loading frame near the top of the same, a substantially vertical hay unloading member carried by such reciprocating member and depending from the same for co-action with the substantially horizontal hay gathering member when such member is in a raised position, and power operated means to move the second named reciprocating member.

5. In a hay loader, a wheeled support, a substantially vertical support frame pivotally mounted upon the wheeled support to swing vertically, manually operated means including a substantially horizontal member slidably mounted upon the wheeled support and disposed above the same and connected with the support frame for swinging the same, a substantially vertical loading frame pivotally connected with the support frame and adapted to swing horizontally, flexible elements attached to the loading frame upon opposite sides of the same and extending rearwardly therefrom, a traveler mounted upon the loading frame and adapted to be raised and lowered, a flexible element connected with the traveler and extending above the same, guide means arranged near the top of the support frame for engagement with said flexible element, said flexible element extending rearwardly of the guide means, a hay gathering member mounted upon the traveler and extending laterally thereof, a horizontally movable hay ejecting member mounted upon the loading frame near opposite ends of the same for causing such member to move in opposite directions, guide means disposed near the top of the loading frame for engagement with the flexible elements of the hay ejecting member, such flexible elements engaging such guide means and extending rearwardly therefrom, and separately controlled power operated winding means for the first and second named flexible elements and for the flexible element connected with the traveler, said winding means being arranged near the end of the wheeled support remote from the support frame and mounted upon the wheeled support.

6. In a hay loader, a wheeled support, a support frame attached to the wheeled support, a loading frame pivotally connected with the support frame and adapted to move horizontally, a hay gathering member mounted upon the loading frame and adapted to move longitudinally thereof, means for moving the loading frame and hay gathering member, such means including a pair of winding drums, a substantially horizontal rotatable shaft for slidably and rotatably receiving each drum thereon, said shafts being adapted to be driven in opposite directions, power operated means for driving the shafts, a brake on each drum, resilient means urging said brakes into their working positions, a friction clutch member on each drum, a friction clutch member carried by each shaft for rotation therewith and spaced from the adjacent clutch member of the drum, manually operated means to move the drum into and out of clutching engagement, manually operated means to release the drums from their brakes, and a flexible element fastened to each side of the loading frame, one of such flexible elements leading to one of said drums for being wound thereon, the second flexible element leading to the other of said drums for being wound thereon.

7. A hay loader, comprising a wheeled support, a support frame mounted upon the wheeled support, an upright loading frame pivotally mounted upon the support frame and adapted to swing horizontally, a hay gathering member carried by the loading frame and adapted to be raised and lowered thereon, means to raise and lower the hay gathering member, means to swing the loading frame and hay gathering member horizontally, a hay unloading member movably mounted upon the top of the loading frame, means to move such hay unloading member at right angles to the path of travel of the hay gathering member, the last named means including a pair of winding drums, a rotatable shaft for slidably and rotatably receiving each drum, power operated means to drive the shafts in opposite directions in unison, a brake for each drum, a friction clutch for each drum, the brakes normally engaging the drums, control means to engage each drum with the corresponding clutch, means for releasing the brakes on the corresponding drums, and flexible elements attached to the hay unloading member near its opposite ends, one such flexible element being connected with and windable upon one of the drums, the second flexible element being connected with and windable upon the other drum.

8. In a hay loader, a wheeled frame, a support frame mounted upon the wheeled frame, a loading frame pivotally mounted upon the support frame and adapted to swing horizontally, means to swing the loading frame, a hay gathering member mounted upon the support frame and adapted to be raised and lowered, means to raise and lower the hay gathering member, and movable hay unloading means separate from the hay gathering member disposed near the top of the loading frame and adapted to move substantially at right angles to the path of travel of the hay gathering member, and means separate from the hay gathering member to move the hay unloading means.

CHARLES J. SMITH.

(References on following page)

REFERENCES CITED

The following references are of record in the file of this patent:

UNITED STATES PATENTS

| Number | Name | Date |
|---|---|---|
| 667,379 | Woolery | Feb. 5, 1901 |
| 799,077 | Nelson | Sept. 12, 1905 |
| 856,966 | Lewis et al. | June 11, 1907 |
| 1,556,262 | Streeter | Oct. 6, 1925 |
| 1,560,791 | Anthony | Nov. 10, 1925 |
| 2,372,870 | Willrodt | Apr. 3, 1945 |
| 2,405,312 | Mandt | Aug. 6, 1946 |